United States Patent [19]

Zietlow et al.

[11] Patent Number: 5,012,434

[45] Date of Patent: Apr. 30, 1991

[54] APPARATUS AND METHOD FOR SELECTIVE ROTATION OF DATA PRINTED BY A MATRIX PRINTER

[75] Inventors: Kurt Zietlow, Erding; Ernst Engst, Munich, both of Fed. Rep. of Germany

[73] Assignee: Siemens Aktiengesellschaft, Berlin and Munich, Fed. Rep. of Germany

[21] Appl. No.: 378,508

[22] Filed: Jul. 12, 1989

Related U.S. Application Data

[63] Continuation of Ser. No. 314,300, Feb. 21, 1989, abandoned, which is a continuation of Ser. No. 816,905, Jan. 8, 1986, abandoned.

[51] Int. Cl.$^5$ ............................................. G06F 15/20
[52] U.S. Cl. ................................... 364/523; 364/521; 340/727; 346/154
[58] Field of Search .............................. 340/727, 799; 364/900 MS File, 519, 518, 521, 523; 382/46; 346/154; 358/296

[56] References Cited

U.S. PATENT DOCUMENTS

| | | | |
|---|---|---|---|
| 3,976,982 | 8/1976 | Eiselen | 364/900 |
| 4,168,488 | 9/1979 | Evans | 382/46 |
| 4,271,476 | 6/1981 | Lotspiech | 340/727 |
| 4,311,723 | 1/1982 | Mugrauer | 427/14.1 |
| 4,312,045 | 1/1982 | Jean et al. | 340/727 |
| 4,368,491 | 1/1983 | Saito | 358/283 |
| 4,554,638 | 11/1985 | Iida | 340/727 |
| 4,593,407 | 6/1986 | Konishi et al. | 340/727 |
| 4,635,212 | 1/1987 | Hatazawa | 364/519 |
| 4,660,029 | 4/1987 | Houda et al. | 340/799 |
| 4,689,824 | 8/1987 | Mitchell et al. | 382/46 |
| 4,703,515 | 10/1987 | Baroody, Jr. | 382/46 |
| 4,729,107 | 3/1988 | Hasegawa et al. | 364/519 |
| 4,736,442 | 4/1988 | Kornfeld | 382/44 |
| 4,806,920 | 2/1989 | Sawada | 340/727 |

OTHER PUBLICATIONS

Gold–"Shift Register Implemented Image Rotator/Transposer", IBM Technical Disclosure Bulletin, vol. 17, No. 10, Mar. 75.

Gold et al., "Shift Register System for Image Orientation", IBM Technical Disclosure Bulletin, vol. 18, No. 8, 1/76.

Primary Examiner—Dale M. Shaw
Assistant Examiner—Phu K. Nguyen
Attorney, Agent, or Firm—Hill, Van Santen, Steadman & Simpson

[57] ABSTRACT

An electro-photographic matrix printer such as a laser printer has characters to be printed stored as bits in columns and rows of a bit pattern page memory. The bits are read from the bit pattern page memory in the form of individually addressable blocks of bits, the order of the blocks read from said bit pattern page memory being selected to give a selected degree of rotation to the printed image produced by said printer, with the order of bits within each block being presented to the printer to provide a rotated image within each individually addressable block.

9 Claims, 6 Drawing Sheets

| | S1 S3 S5 | | | |
|---|---|---|---|---|
| Z1 Z2 Z3 Z4 Z5 | DA | DB | DC | DD | DE |
| | DF | DG | DH | DI | DK |
| | DL | DM | DN | DO | DP |
| | DQ | DR | DS | DT | DU |
| | DV | DW | DX | DY | DZ |

FIG 4

| DE | DK | DP | DU | DZ |
|---|---|---|---|---|
| DD | DI | DO | DT | DY |
| DC | DH | DN | DS | DX |
| DB | DG | DM | DR | DW |
| DA | DF | DL | DQ | DV |

FIG 5

| DE | DK | DP | DU | DZ |
|---|---|---|---|---|
| DD | DI | DO | DT | DY |
| DC | DH | DN | DS | DX |
| DB | DG | DM | DR | DW |
| DA | DF | DL | DQ | DV |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG 8

0° ROTATION

| A | B | C | D | E |
|---|---|---|---|---|
| F | G | H | I | K |
| L | M | N | O | P |
| Q | R | S | T | U |
| V | W | X | Y | Z |

FIG 9

90° ROTATION

| V | Q | L | F | A |
|---|---|---|---|---|
| W | R | M | G | B |
| X | S | N | H | C |
| Y | T | O | I | D |
| Z | U | P | K | E |

FIG 10

180° ROTATION

| Z | Y | X | W | V |
|---|---|---|---|---|
| U | T | S | R | Q |
| P | O | N | M | L |
| K | I | H | G | F |
| E | D | C | B | A |

FIG 11

270° ROTATION

| E | K | P | U | Z |
|---|---|---|---|---|
| D | I | O | T | Y |
| C | H | N | S | X |
| B | G | M | R | W |
| A | F | L | Q | V |

FIG 12

APPARATUS AND METHOD FOR SELECTIVE ROTATION OF DATA PRINTED BY A MATRIX PRINTER

This is a continuation of application Ser. No. 314,300, filed Feb. 21, 1989, now abandoned.

This is a continuation of application Ser. No. 816,905, filed Jan. 8, 1986, also abandoned.

BACKGROUND

1. Field of the Invention

The present invention relates to matrix printers such as laser printers and the like, and more particularly to apparatus for allowing the selective rotation of a printed image into one of a plurality of discrete orientations.

2. Prior Art

Matrix printers operating on the principal of electrophotography (i.e. laser printers) are generally known. Such a printer is disclosed for example in U.S. Pat. No. 4,311,723.

Such a printer causes print to be applied to a continuous form which runs through the printer at relatively high speed. Conventionally the printed matter is printed upright on the form, for example in a line-by-line basis. An attempt to change the orientation of the data from upright to broadside has heretofore been accomplished by using a separate character set for each specific rotation. However this procedure is relatively complicated and expensive, and requires the establishment of separate character sets for each rotational angle to be used.

BRIEF SUMMARY OF THE INVENTION

It is a principal object of the present invention to provide a page rotation mechanism for a electro-photographic printer which enables a print page to be printed out in an arbitrary selected rotational orientation.

It is another object of the present invention to provide apparatus and a method for readily accomplishing a change between upright and broadside formats, without an intrusive interruption of the printing operation.

In order to achieve these goals, a page rotation mechanism is interposed between the DOT generator and the HF generator, for accomplishing a selective rotation of the image to be printed into a specific rotational orientation.

The rotation mechanism incorporates two page memories each of which take the form of dot matrix memories, with a size for holding the characters of a maximally printable page. Page rotation may be accomplished by alternately write-in, and read-out, of the two memories, with sequences which correspond to the desired rotational operation. This arrangement requires a minimum of additional equipment and therefore minimizes the complexity and expense of the equipment.

Print requests are forwarded to the electro-photographic printer in the usual way. Only one additional control character is required to designate the desired rotational sense. The page length and page width is also supplied to the printer conventionally, either by way of a manual input device, or directly by means of the central control apparatus.

BRIEF DESCRIPTION OF THE DRAWINGS

Reference will now be made to the accompanying drawings in which.

DESCRIPTION OF THE PREFERRED EMBODIMENT

Figure 1:
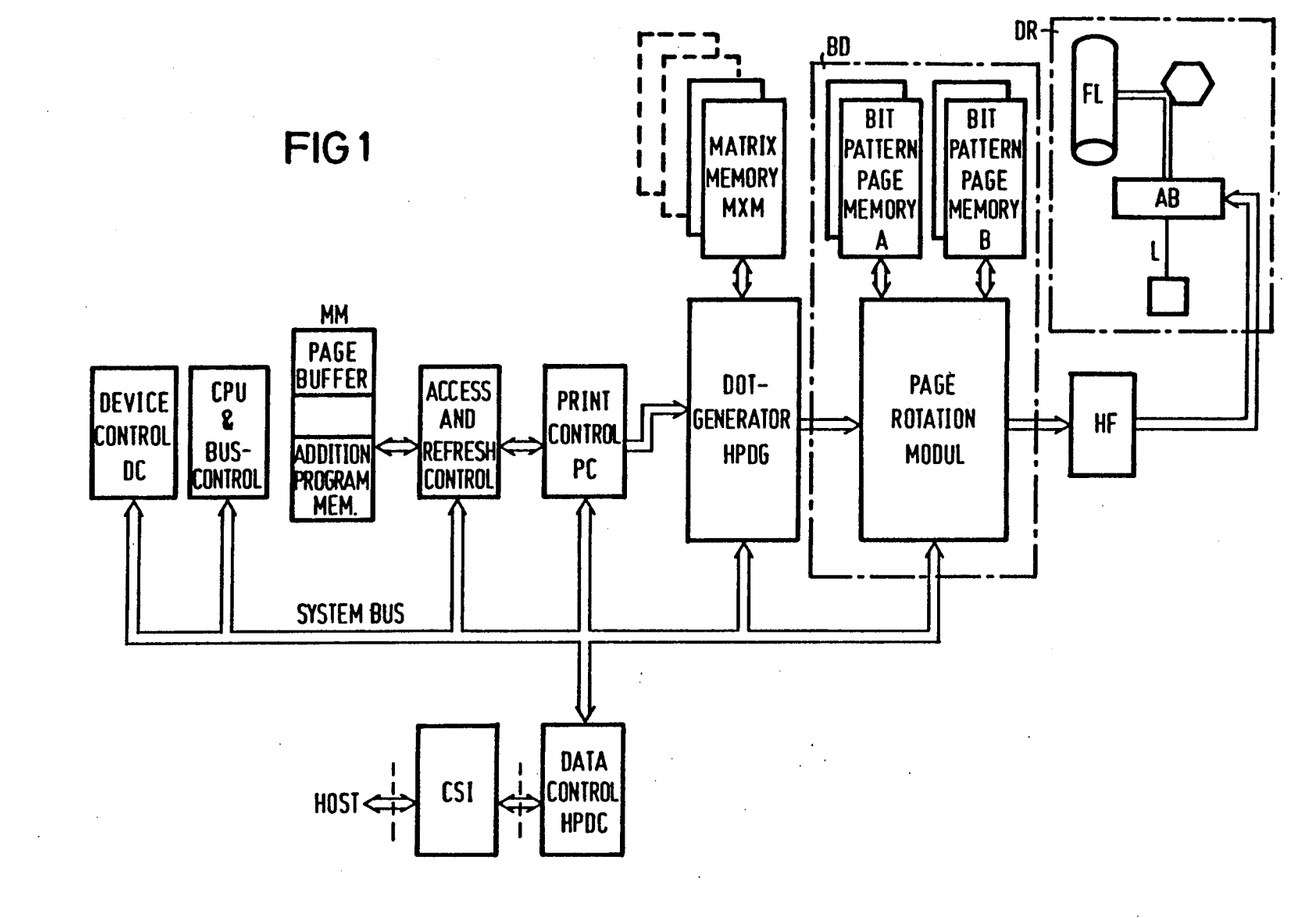
FIG. 1 is a schematic illustration of the components of a laser printer system incorporating an illustrative embodiment of the present invention.

FIG. 1 illustrates the general organization of a laser printer, incorporating an illustrative embodiment of the present invention, such printer being as disclosed for example in U.S. Pat. No. 4,311,723. In accordance with the present invention a page rotation device BD is inserted into the data flow between the dot generator HPDG and the HF generator. The laser printer contains an acusto-optical deflection system AB as described in the aforesaid U.S. patent. A laser beam is split into six beams by this deflection system, five of which serve for generating print characters, with a sixth serving the purpose of generating a clock. The five write beams which are used for generating graphic characters are modulated by an HF generator which receives as its input signals from a dot generator HPDG. As illustrated in FIG. 1, the page rotation device BD is interposed between the dot generator HPDG and the HF generator. The output of the dot generator HPDG corresponds to the discrete points of graphical characters which are to be printed, on a bit-by-bit basis. The print lines are fetched from a page buffer in main memory MM. The dot generator HDPG is used in communication with a matrix memory MXM in which the characters are stored on a bit-by-bit basis. In operation, input signals, representing for example, alphanumeric characters are supplied to the input of the dot generator, and the dot generator supplies to its output a sequence of bits representing points in a plurality of lines which together make up the character. For example, 25 bits may be produced, corresponding to five rows of five bits each. Alternatively, a greater number of bits may be output when it is desired to represent characters with more points, such as ten lines of ten bits each, etc.

The dot generator HPDG is driven by print control unit PC and by the central processing unit CPU of the printer. The CPU controls text transmission, and also controls the individual units of the printer via the device control unit DC, such as the paper feed, the photoconductive drum, etc. The CPU also controls the management of the main memory MM, which contains the page buffer, and additional program memory.

A channel system interface unit CSI forms the data channel interface between the host system and the printer, via a data control unit HPDC. The data supplied from the host is in the form of coded data, and the HPDC unit converts the data into matrix addresses by use of a code table, and writes the data into the page buffer of the main memory MM by way of a direct memory access control. The matrix addresses are used by the dot generator HPDG to access the appropriate portions of the matrix memory MXM which contain desired graphic characters in bit form. During printing, the print control unit PC fetches a page from the page buffer, and outputs this information on a line-by-line basis to the dot generator HPDG, which then refers to the matrix memory MXM and generates the bit pattern of the discrete points to be printed. This information, which could be supplied directly to the HF unit if no rotation is desired, is then supplied to the page rotation device BD.

Figure 2:
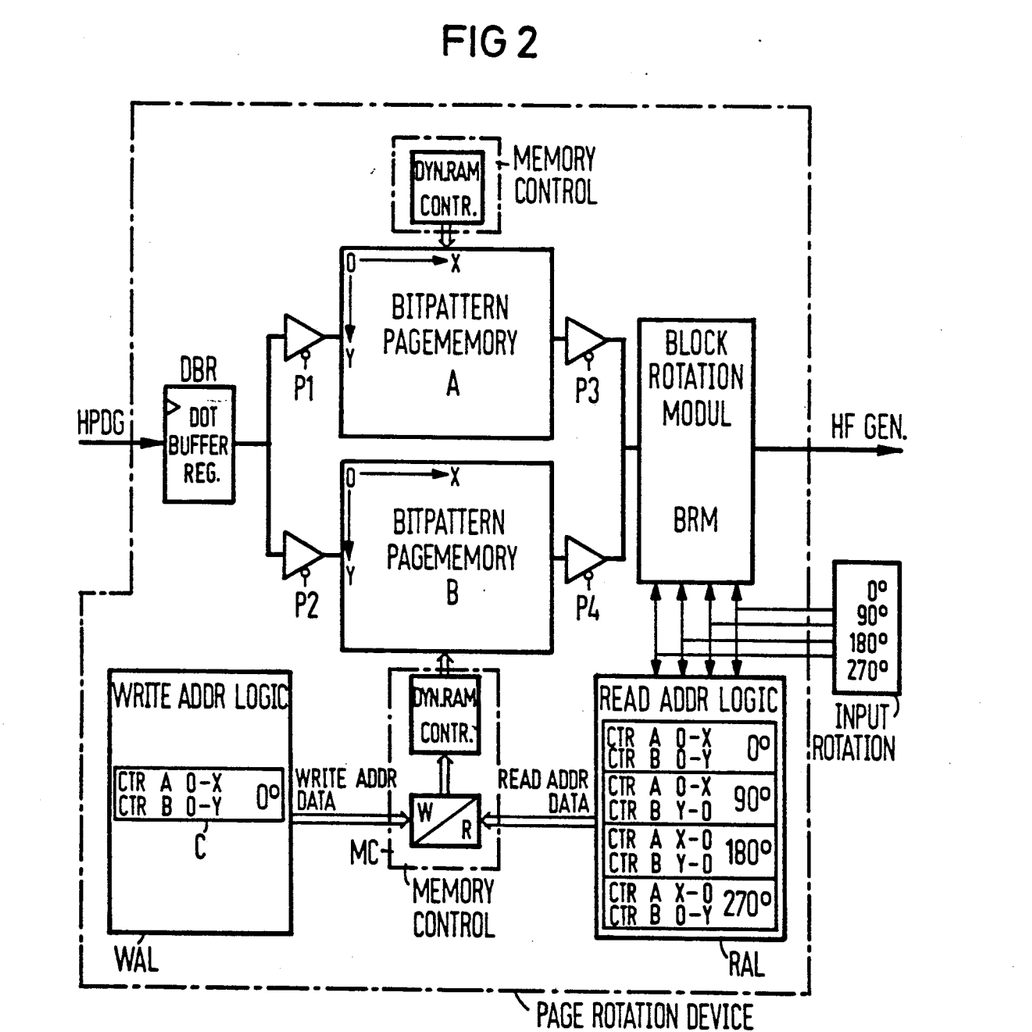
FIG. 2 is a schematic illustration of the image rotation device.

FIG. 2 illustrates an overall block diagram of the page rotation device BD. It contains a dot buffer register DBR which communicates with two bit pattern page memories A and B, through two ports P1 and P2. The ports P1 and P2 are controllable by the memory control unit MC. A write address logic unit WAL is provided for the bit pattern pages memories A and B, and a read address logic unit RAL is also provided. These logic units incorporate counters which are used in the course of operation of the present invention, as described in more detail hereinafter.

The write address logic unit WAL and the read address logic unit RAL are in communication with the two bit pattern page memories A and B through the common memory control unit MC, and function to drive the bit pattern page memories such that one of the memories A and B is in the read mode while the other is in its write mode. Ports 3 and 4, which are the exit (read) ports from the memories A and B, are also controllable by means of the memory control unit MC. The ports P3 and P4 both connect to an input of the block rotation module BRM which accepts, on a block-by-block basis, the data coming from the bit pattern page memories A and B, and intermediately stores such blocks in a register. It rotates individual blocks in an appropriate way so that the five write beams of the printer can be driven with data via the HF generator, which is connected to the output of the block rotation module BRM.

Figure 3:
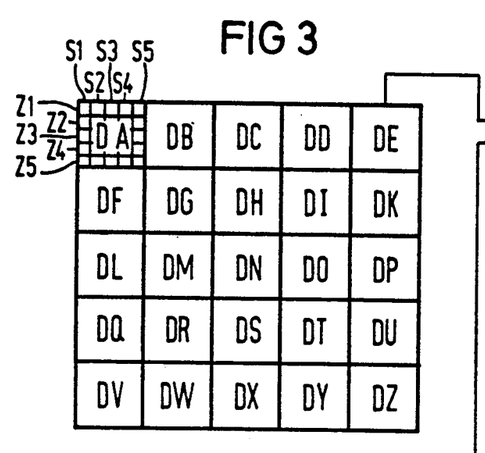
FIGS. 3, 4 and 5 illustrate schematically the shift of data blocks during a rotation operation.

The preferred printer used with the present invention is a laser printer having a photoconductive drum FL simultaneously written on by five write beams. These individual lines are referred to as microlines. The data for the five write lines are simultaneously deflected by means of the deflection system AB, via the HF generator HF (FIG. 1). A print page is stored in the form of a plurality of discrete points produced by the dot generator HPDG and stored in one of the bit pattern page memories A and B. The microlines are read out of the dot generator HPDG, with the assistance of the write address logic unit WAL, and are supplied to one of the bit pattern page memories A and B organized in block form. An example page made up of twenty-five individual data blocks DA through DZ is illustrated in FIG. 3. The individual data blocks DA-DZ are each composed of 25 individual bits which form a rectangular matrix of five columns S1-S5 and five rows Z1-Z5. The five rows Z1-Z5 correspond to the aforesaid microlines. Each individual data block DA-DZ is first built up in the dot buffer register DBR (which may function as a serial-to-parallel converter), and is then stored in position in one of the bit pattern page memories A or B, which starts the microlines as a bit mapped image. Each storage location of the page memories A and B is mapped to a part of the page which would be printed by the laser printer if there were no rotation.

After a complete transfer of the data into the memory, as shown in FIG. 3, the individual blocks are read out of the bit pattern page memory A (or B) with the assistance of the read address logic unit RAL, and are read out in a sequence corresponding to the desired rotational angle. When read out, they are deposited in a register forming a buffer memory of the block rotation module BRM, in the sequence illustrated in FIG. 4. The buffer memory of the block rotation module is a register REG (FIG. 12) which is described in more detail hereinafter. It is a parallel register which makes all 25 bits available simultaneously.

Figure 4:
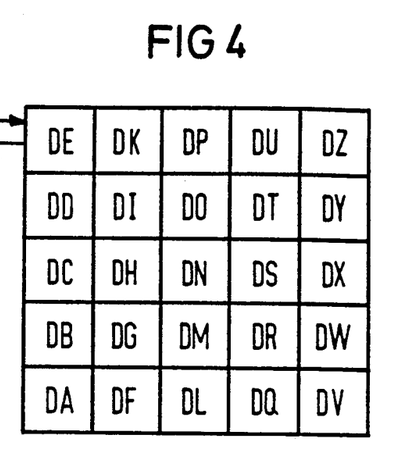

In accordance with FIG. 4, the block DE is first read out from the buffer memory, followed by the block DD the block DC, DB, DA, DK, DI etc., each block is deposited in the register REG (FIG. 12) within the block rotation module BRM. As indicated in FIG. 4, although the positions of the blocks are themselves rotated, the individual data points within each block remain unrotated. They become rotated later with the assistance of the block rotation module. As the data, emerges from the block rotation module, it has the arrangement illustrated in FIG. 5, which indicates that the data within each block has been rotated in the same degree as the rotation of the individual blocks between FIGS. 3 and 4.

Figure 5:
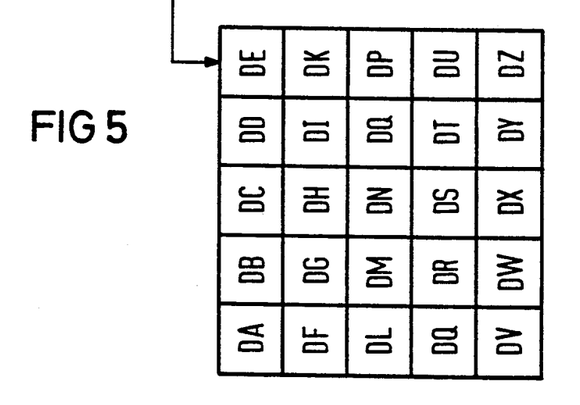
Figure 6:
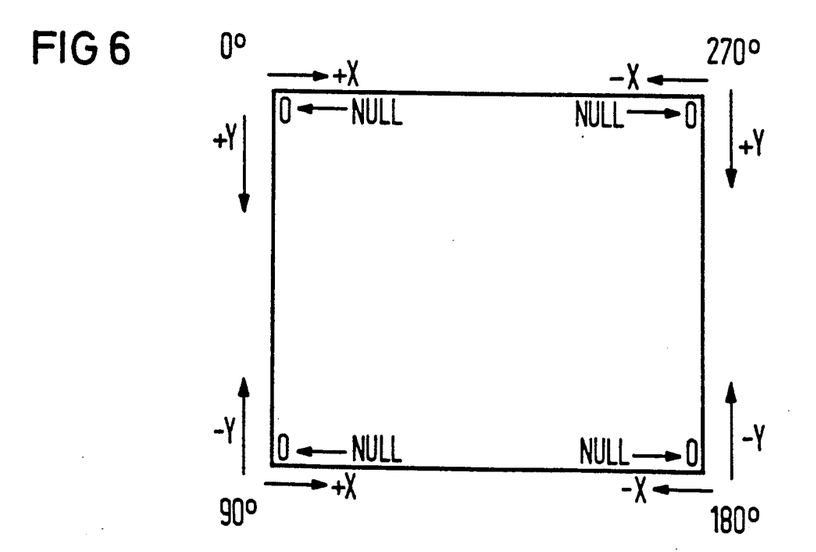
FIG. 6 is a schematic illustration showing rotation of individual bits in the data block.

Upon readout of the bit pattern of the discrete points to be printed from the bit pattern page memories A and B, through the block rotation module BRM, the data supplied to the HF generator unit is in a form which has been rotated counterclockwise by 90°, in the examples of FIGS. 3-5. FIG. 6 indicates the location of a reference point (called a page zero-point) on the page to be printed (for example the upper left hand corner), for different degrees of rotation. For 0°, the page zero-point is located in the upper left hand corner, for 90° the point is at the lower left hand corner, for 180° the point is at the lower right hand corner, etc.

Data is read out from the page memories A and B by the use of two counters A and B, which together designate the address within the bit pattern page memory of data to be read out at any given time. The counter A is for the X-direction, and the counter B is for the Y-direction (relative to the rotated page orientation). The counter A may be referred to as a block counter, with the counter B being referred to as a sub-line counter. A page in the example of FIGS. 3-5 is made up of five sub-lines each having five blocks. The direction of counting of these counters, for addressing the blocks being read out from the page memories A and B are illustrated in Chart I.

| | Chart I | |
|---|---|---|
| Rotational Sense | Block Counter A | Sub-Line Counter B |
| 0 degrees | +X | +Y |
| 90 degrees | −Y | +X |
| 180 degrees | −X | −Y |
| 270 degrees | +Y | −X |

With a rotation of 0°, there is no rotation, and both the A and B counters count upwardly (scanning the array of FIG. 3 rightwardly and downwardly), which results in readout of the individual blocks in the order DA, DF, DL, DQ, DV, DB, etc., in the normal sequence, to result in a normal printed page.

For a rotation of 90°, the page zero-point migrates to the lower left corner, and the array of FIG. 3 is scanned upwardly. The block counter A is counted in a negative-Y-direction, with its value being decremented for each sub-line, beginning with the maximum value L (for the blocks DV-DZ). The sub-line counter B is counted in a positive X-direction. This results in a readout of the blocks in rotated manner, in the order DV, DW, DX, DY, DZ, DQ, etc.

For a rotation of 180°, the page zero-point is displaced into the lower right hand corner, and both the block counter and the sub-line counter are counted downwardly. Thus the block DZ is read out in place of the block DA and vise versa, resulting in rotation of the orientation of the blocks by 180°. The order of read-out is DZ, DU, DP, DK, DE, DY, etc.

For rotation of 270°, the page zero-point lies in the upper right hand corner. The block counter is incremented in a positive Y-direction, and the sub-line counter is decremented in the negative X-direction, beginning with the maximum value (for blocks DE-DZ). The order of read-out is DE, DD, DC, DB, DA, DK, etc.

Figure 7:
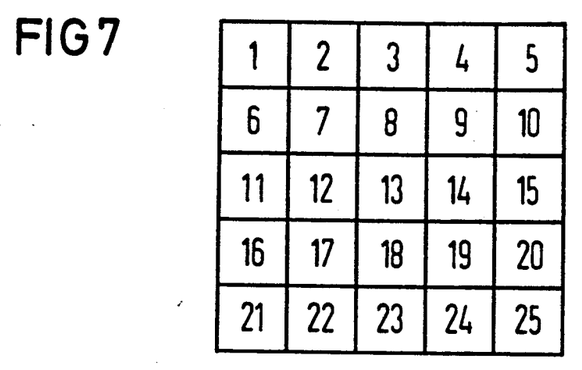
FIGS. 7-11 are schematic illustrations showing the modification of the position, and the arrangement of, the individual bits of a data block upon rotation.
Figure 8:
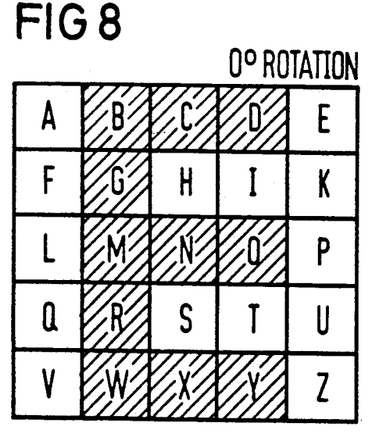
Figure 9:
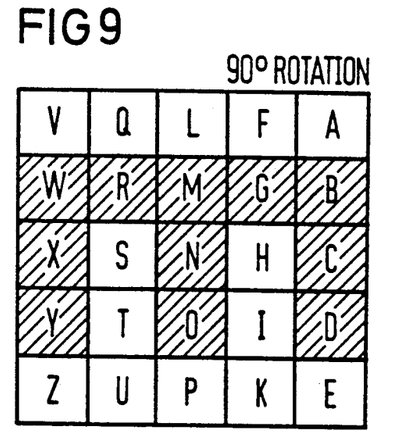
Figure 10:
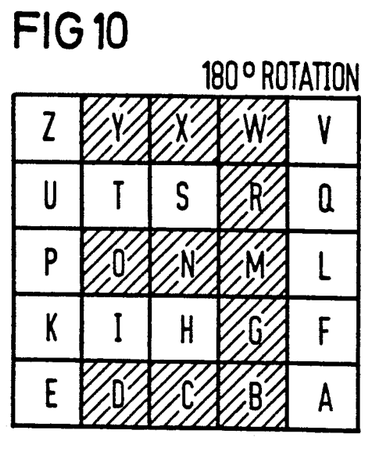
Figure 11:
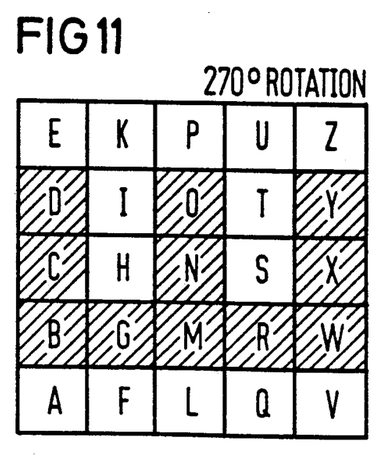

The rotation of the data within the individual data blocks is illustrated with reference to FIGS. 7-11. Each block is read out with the 25 bits of a data block in parallel. They represent a square excerpt from the page being printed. Depending on the direction of page rotation, the 25 bits represent dots to be placed on the page in various positions. Referring to FIG. 7, the individual bits of a data block are referred to with numerals 1-25. Such dots are each represented in memory by a logical 0 or 1. The position of the 25 dots is illustrated in FIGS. 8-11 with reference letters A-Z for the positions 1-25 in various rotations. FIGS. 8-11 show a data block containing the letter E shown in four different rotational attitudes. Table II shows the correspondence between the 25 bits which are stored in memory, and the 25 positions on a printed page, for each of four angles of rotation.

TABLE II

| Rotational Sense | 0 | 90 | 180 | 270 degrees |
|---|---|---|---|---|
| Bit. No. 1 | A | V | Z | E |
| 2 | B | Q | Y | K |
| 3 | C | L | X | P |
| 4 | D | F | W | U |
| 5 | E | A | V | Z |
| 6 | F | W | U | D |
| 7 | G | R | T | I |
| 8 | H | M | S | O |
| 9 | I | G | R | T |
| 10 | K | B | Q | Y |
| 11 | L | X | P | C |
| 12 | M | S | O | H |
| 13 | N | N | N | N |
| 14 | O | H | M | S |
| 15 | P | C | L | X |
| 16 | Q | Y | K | B |
| 17 | R | T | I | G |
| 18 | S | O | H | M |
| 19 | T | I | G | R |
| 20 | U | D | F | W |
| 21 | V | Z | E | A |
| 22 | W | U | D | F |
| 23 | X | P | C | L |
| 24 | Y | K | B | Q |
| 25 | Z | E | A | V |

It is advantageous to record the blocks from the page memories A and B, in rotated order, and to rotate the data within each block only when it is read out from the page memories A and B. This results in component savings as well as other advantages.

Figure 12:
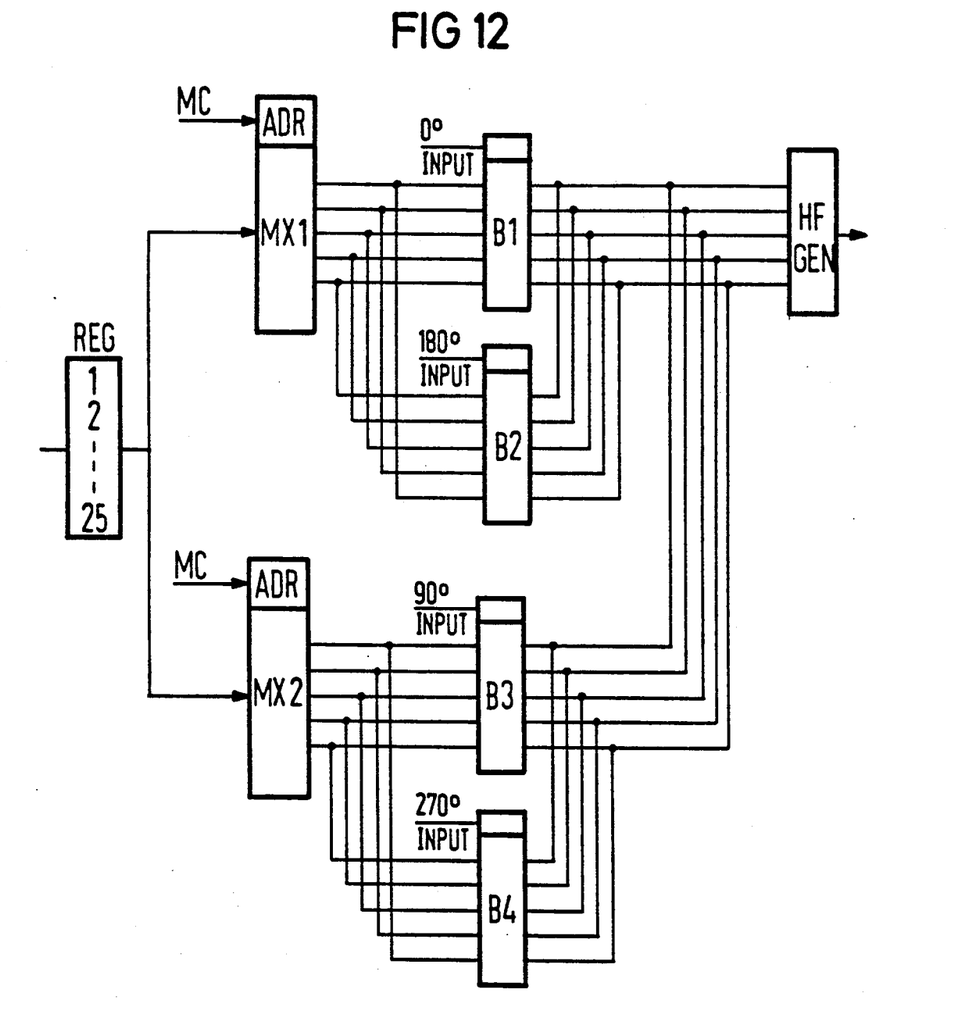
FIG. 12 is a schematic illustration of the block rotation module.

When the data bits are read out from the page memories A and B, they are read through the block rotation module BRM, which is shown in detail in FIG. 12. It contains two multiplexer groups MX1 and MX2, as well as bus drivers B1-B4. The bus drivers serve to present the data on five parallel lines to the HF generator. The multiplexer groups MX1 and MX2 are controlled by control signals MC which are supplied to the multiplexer groups 1 or 2 in order to make multiple groups of five bits each available to the HF generator. An enabling signal is applied to one of the four bus drivers B1-B4 to designate the amount of rotation to be applied to the data. These signals can be input from a special input device, but can also come from the central controller. The signals MC supply a three bit binary code designating which five of the twenty-five inputs is to be supplied to the five outputs of each multiplexer group. The binary code MC cycles continuously through all five selections, so that each input is supplied to the output in correct time sequence the entire 25 points are written. Thus, during the first clock pulse time, the group MX1 supplies bits corresponding to points 1, 2, 3, 4 and 5 to the five output lines. At the second clock pulse, bits 6, 7, 8, 9, 10 are supplied, etc. In this way the bits are supplied to the laser printer in the correct sequence, for any of four rotations, through enabling one of the four bus driver units. The non-selected units remain non-functional until selected.

Figure 13:
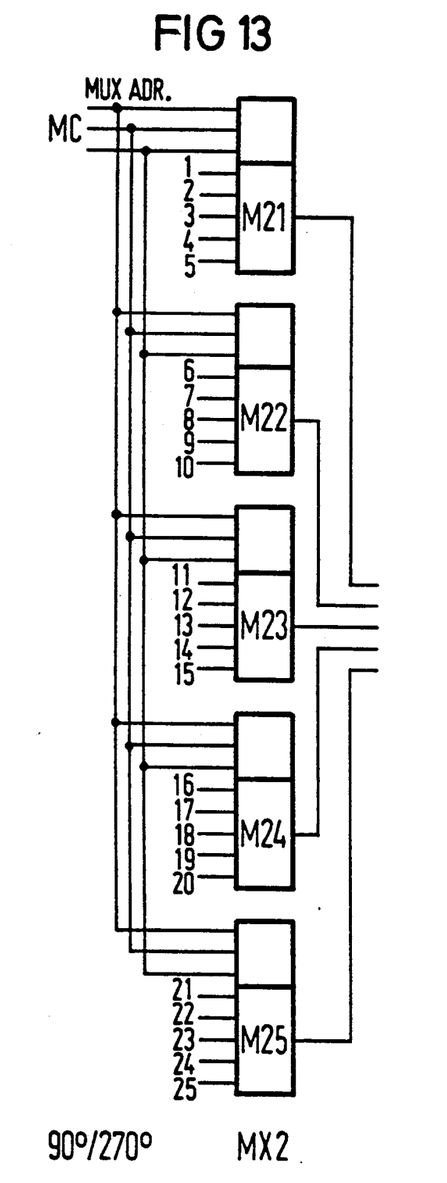
FIGS. 13 and 14 are schematic illustrations of the multiplexer groups incorporated in the apparatus of FIG. 12.
Figure 14:
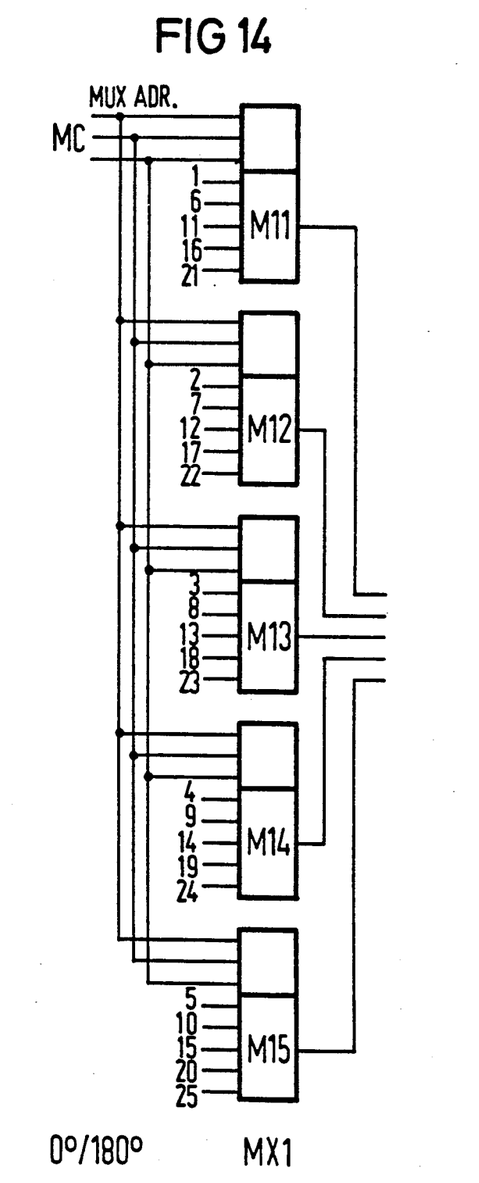

The details of the multiplexer groups MX2 and MX1 are shown in FIGS. 13 and 14 respectively. The MX1 group is made up of five individual multiplexers M11-M15, and the multiplexer group MX2 is made up of five multiplexers M21-M25. They differ only in the way their inputs are wired to the 25 parallel outputs of the register REG (FIG. 12).

The first multiplexer group MX1 executes rotations of 0 and 180°, and the multiplexer group MX2 executes rotations of 90 and 270°. Their inputs are connected to the parallel outputs of the register REG, which receives the 25 bits comprising a block stored in one of the bit pattern page memories A and B. Only one of the two multiplexer groups MX1 and MX2 is active at any given time, and it operates to present the 25 bits of the register REG to the HF generator in five successive groups of five bits, at successive clock times, for the writing of a five bit microline by the laser printer during each clock period. A multiplexer group may be deselected by disabling its MC inputs either by selective signals applied to a chip enable pin on each individual multiplexer or by gates in the MC supply lines.

As numbered in FIGS. 7, 13 and 14, the data bits 1-5 represent the dot information for the first point of the five print beams. Bits 6-10 represent the second point of the five print beams, etc. Since the output of each multiplexer emits a dot for one of the print beams, they are controlled to present each of its five inputs to its output, during successive clock pulse times. Table III indicates the relationship of the individual beams of the laser printer and the order of the bits presented to the HF generator, for each of the data bit positions 1-25 (corresponding to A-Z in FIG. 8-11).

TABLE III

| Data Bit No. | Content (Beam/MUX ADR) |
|---|---|
| 1 A | 1/1 |
| 2 B | 2/1 |
| 3 C | 3/1 |

TABLE III-continued

| Data Bit No. | Content (Beam/MUX ADR) |
|---|---|
| 4 D | 4/1 |
| 5 E | 5/1 |
| 6 F | 1/2 |
| 7 G | 2/2 |
| 8 H | 3/2 |
| 9 I | 4/2 |
| 10 K | 5/2 |
| 11 L | 1/3 |
| 12 M | 2/3 |
| 13 N | 3/3 |
| 14 O | 4/3 |
| 15 P | 5/3 |
| 16 Q | 1/4 |
| 17 R | 2/4 |
| 18 S | 3/4 |
| 19 T | 4/4 |
| 20 U | 5/4 |
| 21 V | 1/5 |
| 22 W | 2/5 |
| 23 X | 3/5 |
| 24 Y | 4/5 |
| 25 Z | 5/5 |

For the multiplexer unit MX2 (for 90° and 270° C. rotation), the connection of the bit positions to the multiplexer inputs are indicated in Table IV.

TABLE IV

| Multiplexer | Bit Number at the Input | | | | |
|---|---|---|---|---|---|
| | 1 | 2 | 3 | 4 | 5 |
| 1 | 1 | 6 | 11 | 16 | 21 |
| 2 | 2 | 7 | 12 | 17 | 22 |
| 3 | 3 | 8 | 13 | 18 | 23 |
| 4* | 4 | 9 | 14 | 19 | 24 |
| 5 | 5 | 10 | 15 | 20 | 25 |

Table V indicates the connection of the bit positions to the multiplexer inputs for the multiplexer group MX1 (FIG. 14).

TABLE V

| Multiplexer | Bit Number at the Input | | | | |
|---|---|---|---|---|---|
| | 1 | 2 | 3 | 4 | 5 |
| 1 | 1 | 2 | 3 | 4 | 5 |
| 2 | 6 | 7 | 8 | 9 | 10 |
| 3 | 11 | 12 | 13 | 14 | 15 |
| 4 | 16 | 17 | 18 | 19 | 20 |
| 5 | 21 | 22 | 23 | 24 | 25 |

One of the four bus drivers B1-B4 of FIG. 12 is made active to pass its inputs to the output lines connected to the inputs of the HF generator. The inputs of the bus drivers B1 and B2 are connected in common, but the outputs are connected in opposite order, so that the signals supplied to lines 1 and 5 are reversed etc. This accomplishes the rotation of the data within the block by 180°.

The bus drivers B3 and B4 are also connected to receive common inputs from the multiplexer group MX2, and are connected so that the signals supplied to their output lines are reversed. This accomplishes a shift of 180° in rotation (between 90° and 270° C.). A 90° shift occurs already in the multiplexer group MX2 by virtue of the manner of its input connections, as illustrated in FIG. 13.

It is apparent that the present invention provides a simple and effective means for rotating the image to be printed into any four different rotational positions, without requiring multiple character generators, or their associated equipment. By use of the present invention, a relatively small amount of additional equipment is required, and no slowdown occurs in the printing operation. The use of alternate memories A and B, and controlling the memories of A and B so that one is reading while the other is writing, and vice versa, enables the rotation operations of the present invention to be carried out with no delay introduced in the printing.

While the preferred embodiment described above stores the data in unrotated form in the bit pattern page memories A and B, it will be apparent that the rotation of the blocks may be effected during writing of the data into the memories A and B, instead of during reading of data out from such memories. In that event, the units WAL and RAL are interchanged, so that write address logic unit addresses storage locations for blocks according to the selected rotation, as described above in connection with the read address logic unit RAL. The page memories A and B are then read out in standard sequence, through the block rotation module, which rotates the position of the data bits within each block. Alternatively, the block rotation module may be connected to the output of the dot buffer register DBR, to rotate the bit positions as they are being written into the bit pattern page memories A and B.

It will be apparent that various additions and modifications may be made by those skilled in the art without departing from the essential features of novelty of the present invention, which are intended to be defined and secured by the following claims.

What is claimed is:

1. A method for representing a page of graphical symbols printed by an electro-photographic matrix printer, with a selected angular rotation, including the steps of, storing said page as a page of graphical symbols to be printed in a bit pattern page memory as bits in a bit pattern arranged in columns and rows, said page memory storing said page of graphical symbols in the form of a plurality of blocks, in which the orientation of the blocks is rotated and the bit patters of said blocks is not rotated, and driving said printer with said bit pattern for printing in line-by-line fashion for generating said page to be printed by reading out said bits from said bit pattern page memory in a predetermined sequence, with the orientation of the bits within the blocks being rotated, to produce a selectively rotated representation of said page to be printed through normal line-by-line operation of said printer.

2. A method for representing a page of characters, including alphanumeric characters or graphical symbols composed of discrete points using an electro-photographical matrix printer for producing a rotated image of said page of characters, including the steps of, selecting a print format, depositing representations of said characters making up said page in a page buffer, reading print lines on a line-by-line basis from said page buffer, using a matrix memory for converting signals corresponding to characters represented by line-by-line bit patterns corresponding to the selected print format, intermediately storing said bit patterns in a bit pattern page memory in a rotated form corresponding to the rotated representation of said print page, in the form of a plurality of blocks, and selectively reading out said bit pattern page memory while rotating the bit pattern within each said block to produce signals adapted to be supplied as input signals to said printer for printing a rotated image of said page.

3. The method according to claim 2, including the steps of supplying data to be printed from said page buffer to a DOT generator, reading bits from said DOT generator and writing said bits into said bit pattern page memory, and reading said bits from said bit pattern page memory and supplying said bits to said printer in a sequence corresponding to said rotated representation of a print page.

4. The method according to claim 3 wherein the bits of said DOT generator are divided into individually addressable data blocks of identical size and including the step of writing said data blocks into said bit pattern page memory.

5. Apparatus for selective rotation of pages printed by an electro-photographic printer comprising, in combination, a bit pattern page memory for the storage of a page of characters, including alphanumeric characters or graphical symbols as bits within said memory, mapped to a fixed predetermined orientation relative to discrete points on the page to be printed, and a page rotation device for causing the printing of a rotated page, said rotated page being rotated through a selected one of a plurality of rotational angles, said page rotation devices having reading means for reading blocks of bits out of said bit pattern page memory, the bits of each block being read in an order corresponding to said fixed predetermined orientation, and said blocks being read out in an order corresponding to said selected rotational angle and in the sequence required by said printer to print said rotated page, and a block rotation module for producing drive output signals, corresponding to the bits of said block as they are read out from said bit pattern page memory, said bits of said drive output signals being produced in a rotated order relative to said blocks, corresponding to said selected rotation, said block rotation module being connected to said reading means for rotating the bit pattern within individual data blocks in accordance with said selective rotational angle and for supplying said drive output signals, whereby said drive output signals are produced corresponding to the bits of said data blocks in a sequence which enables said printer to print said rotated page.

6. Apparatus according to claim 5 including a page buffer data corresponding to, the page to be printed being stored in said page buffer, and a DOT generator connected to a matrix memory and connected to receive characters to be printed, said DOT generator providing an output corresponding to bit patterns stored in said matrix memory forming lines of characters to be printed.

7. Apparatus according to claim 5, wherein said bit pattern page memory comprises two separate bit pattern page memory units, said two memory units being alternately subjected to write and read cycles, whereby one of said two memory units is in its write condition while the other is simultaneously being read out.

8. Apparatus according to claim 5 including input means for said page rotation device for supplying an input corresponding to a selected rotational angle.

9. Apparatus for selective rotation of pages printed by an electro-photographic printer comprising, in combination, a bit pattern page memory for the storage of a page of characters, including alphanumeric characters or graphical symbols as bits within said memory map to discrete points, means for generating memory output signals for sequences of points to be printed by said printer on a line-by-line basis corresponding to the content of said bit pattern page memory, and a page rotation device connected to receive said memory output signals as blocks of bits and for producing drive output signals, said blocks being read out in rotated order as required by said printer to print a rotated representation of said page to be printed, said page rotation device incorporating means for selecting one of the plurality of rotational angles of rotation, said means for generating memory output signals comprising read out address logic means for reading said blocks from said bit pattern page memory in a sequence corresponding to said selected rotational angle of the page to be printed, and a block rotation module for directly rotating the bit pattern within individual data blocks in accordance with said selected rotational angle and for directly producing said drive output signals.

* * * * *